Aug. 27, 1968        V. G. HAROLDSON        3,398,933
ADJUSTABLE PEDESTAL FOR ELEVATED FLOORING
Filed June 29, 1966        2 Sheets-Sheet 2
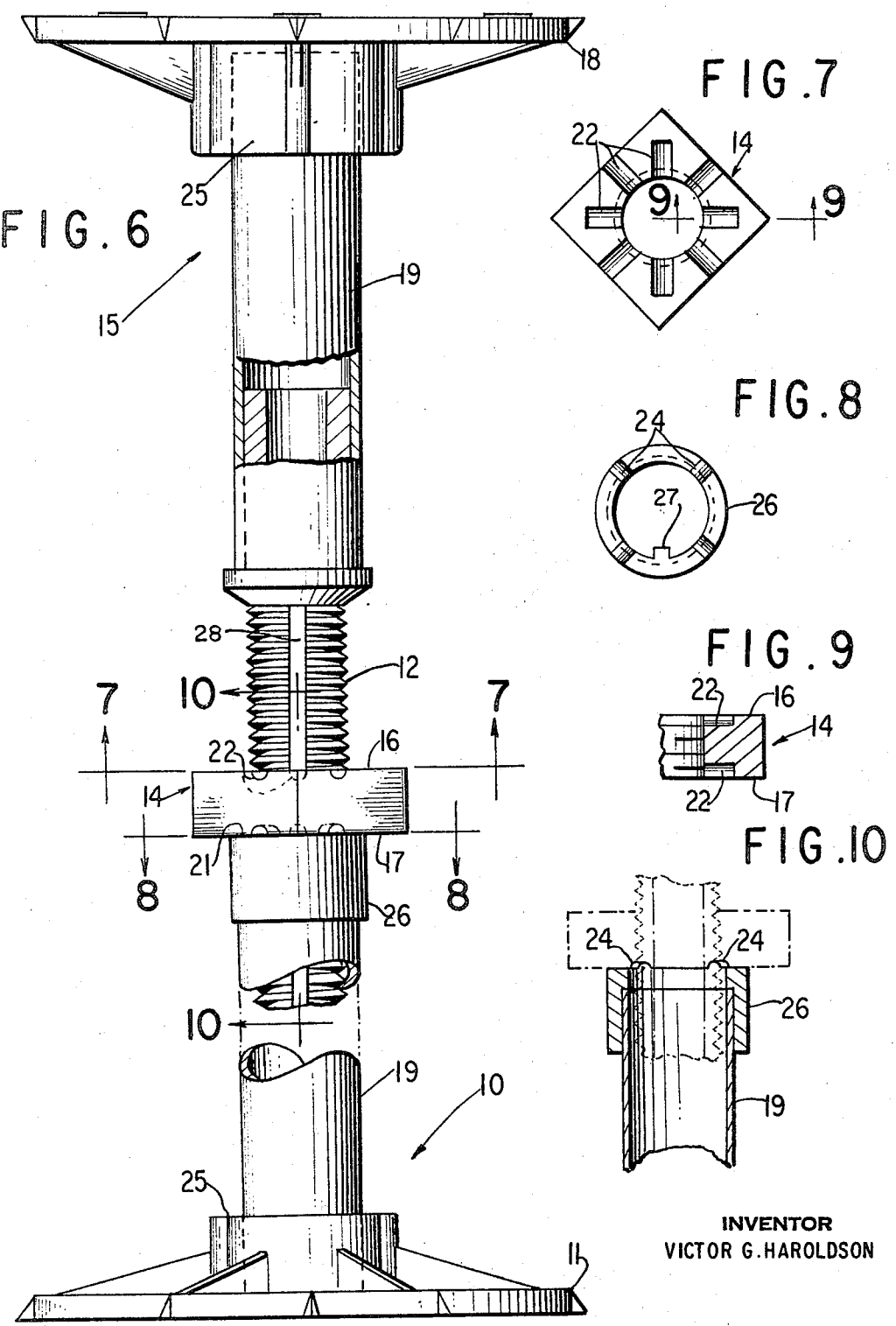
INVENTOR
VICTOR G. HAROLDSON

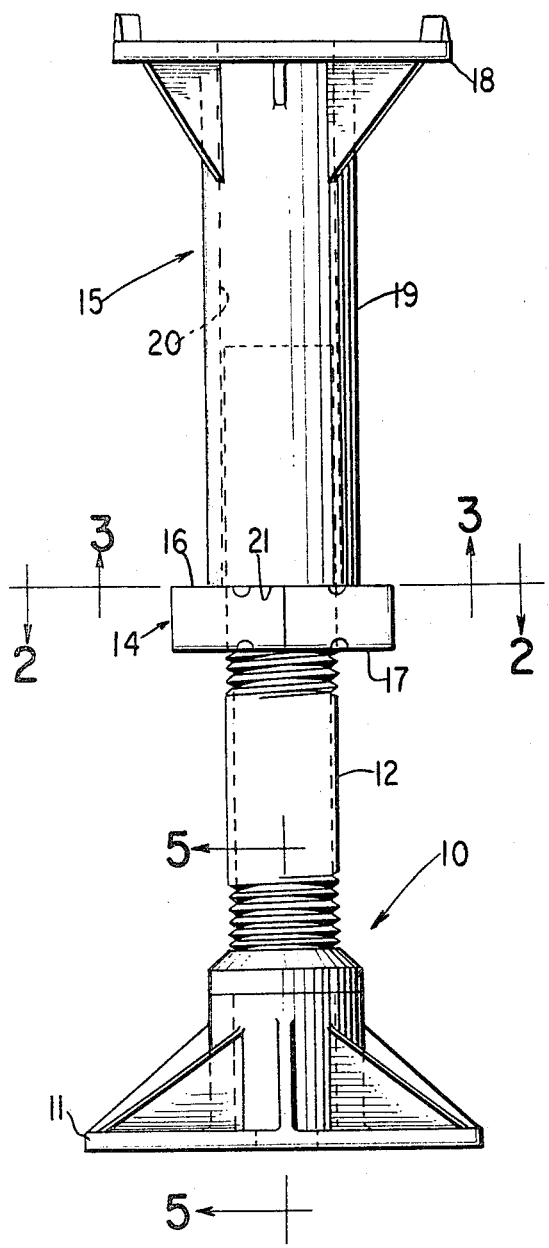
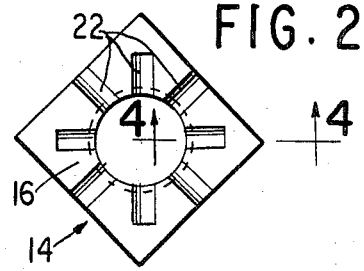
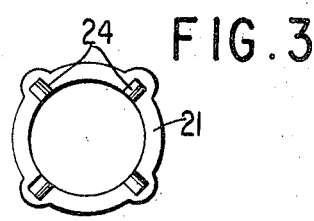
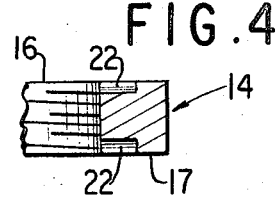
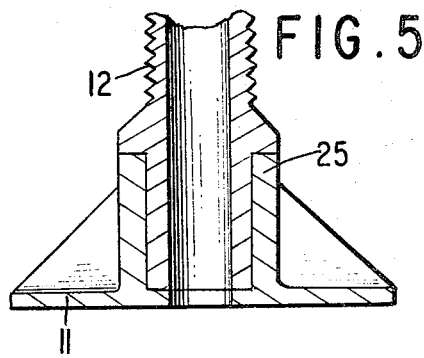

United States Patent Office 3,398,933
Patented Aug. 27, 1968

3,398,933
ADJUSTABLE PEDESTAL FOR
ELEVATED FLOORING
Victor G. Haroldson, 30 Notchpark Road,
Little Falls, N.J. 07424
Filed June 29, 1966, Ser. No. 561,583
2 Claims. (Cl. 254—98)

ABSTRACT OF THE DISCLOSURE

An adjustable pedestal for elevated flooring including a threaded rod, a tubular section for the reception of the rod locked at all times against relative turning of the rod with respect to the tubular section; and a nut threaded on the rod, the nut and the free end of the tubular section having cooperating recess and propitious means for preventing turning of the nut solely by the weight of the flooring imposed on the nut.

---

The present invention relates to elevated flooring such as disclosed in United States Patent No. 3,065,506, Nov. 27, 1963, and more particularly, an improved adjustable pedestal for such flooring which is self locking after being adjusted to its proper height.

The use of elevated flooring to provide an adequate and readily accessible space for the wires and cables of groups of electronic computers and business machines is increasing rapidly. However, difficulties have been encountered in leveling the flooring and maintaining its level by means of adjustable pedestals.

Such pedestals usually comprise a base member having a screw threaded rod thereon, a nut threaded on the rod, and a head member having a tubular portion for reception of the upper end of the rod and provided with an end face supported by the nut. The height of the pedestal is adjusted to level the flooring by turning the nut to its desired head supporting position, but shock and vibration cause the nut to turn and back off whereby the level of the flooring cannot be maintained.

In order to overcome this deficiency, various nut locking devices have been proposed, but these devices have been costly to manufacture and time consuming to install. Other types of locking devices have been devised for the purpose of facilitating installation; but these devices did not lend themselves to accurate leveling adjustments.

Summary of the invention

Accordingly, an object of the present invention is to provide an improved pedestal which overcomes the foregoing difficulties and disadvantages.

Another object is to provide such a pedestal which is readily installed, can be accurately adjusted to level the flooring and is self-locking to maintain the flooring at its adjusted level.

Another object is to provide such a pedestal which reduces the time required for installation and adjustment and eliminates manual errors whereby a considerable saving in the cost of the labor required for installation is achieved.

Another object is to provide such a pedestal which is simple and economical in construction and is reliable in maintaining the accuracy of adjustment.

A further object is to provide such a pedestal which requires a minimum amount of lightweight material and thus is light in weight to keep down shipping costs but yet is as rugged and serviceable as pedestals of much heavier construction.

Other and further objects of the invention will be obvious upon an understanding of the illustrative embodiment about to be described, or will be indicated in the appended claims, and various advantages not referred to herein will occur to one skilled in the art upon employment of the invention in practice.

In accordance with the present invention, the foregoing objects are generally accompilshed by providing a pedestal which comprises a base member, a head member, one of the members having a threaded rod thereon and the other of the members having a tubular portion thereon provided with a bore for the reception of the rod and provided with an end face, and a nut threaded onto the rod and provided with an end face for engaging the end face of the tubular portion, one of the faces having a plurality of circumferentially spaced projections thereon and the other of the faces having a plurality of circumferentially spaced recesses thereon for mating with the projections. Preferably, the recesses and/or projections are relatively shallow to permit the nut to be adjusted while the weight of the flooring bears thereupon, but yet are of a sufficient depth to lock the nut against rotation due to shock or vibration when the weight of the flooring bears on the nut.

In the drawings:

FIG. 1 is an elevational view of one form of pedestal in accordance with the present invention.

FIG. 2 is a sectional view taken along the line 2—2 on FIG. 1.

FIG. 3 is a sectional view taken along the line 3—3 on FIG. 1.

FIG. 4 is a sectional view taken along the line 4—4 on FIG. 2.

FIG. 5 is a fragmentary sectional view taken along the line 5—5 on FIG. 1.

FIG. 6 is an elevational view of another form of pedestal in accordance with the present invention.

FIG. 7 is a sectional view taken along the line 7—7 on FIG. 6.

FIG. 8 is a sectional view taken along the line 8—8 on FIG. 6.

FIG. 9 is a sectional view taken along the line 9—9 on FIG. 7.

FIG. 10 is a fragmentary sectional view taken along line 10—10 on FIG. 6.

Referring now to FIGS. 1 to 5 of the drawings in detail, there is shown a pedestal which comprises a base member 10 having a base plate 11 and threaded vertical rod 12 on the plate, a nut 14 threaded onto the rod having upper and lower end faces 16 and 17, and a head member 15 having a head portion 18 for supporting the flooring (not shown) and having a tubular depending portion 19 provided with a bore 20 for the reception of the upper end of the rod and provided with a lower end face 21 supported on the upper end face 16 of the nut.

As shown more particularly in FIGS. 2 and 3, the upper end face 16 of the nut has a plurality of evenly circumferentially spaced recesses 22, and the lower end face 21 of the tubular portion of the head member has a plurality of evenly spaced projections 24 adapted to register and mate with the recesses 22. The projections and/or recesses are relatively shallow and are formed with arcuate or inclined mating surfaces to allow adjustment but which are of sufficient depth to interlock. Preferably, the projections are substantially radially extending ribs and the recesses are substantially radially extending grooves to provide a good interlock when in registry.

Also a sufficient number of projections and recesses are provided to give a good interlock, for example at least four, but eight or more are preferred to provide for finer angular adjustment of the nut and the head member flooring supporting height thereof. It will be appreciated that there can be twice as many recesses as projections, and that there are sufficient projections to give the necessary interlock. Obviously, the nut could be provided with the projections 24 and the end face of the tubular portion could be provided with the recesses 22.

The base plate is provided with means for securement to the true floor and/or has a roughened surface on the underside for preventing turning of the base member with respect to the floor, and the head member head portion 18 has structure thereon for interlocking with the false flooring to prevent turning of the head member with respect to the flooring as has been conventional heretofore.

As shown in FIG. 4, both end faces of the nut 14 could be provided with recesses so that error of position in assembly is eliminated.

As shown in FIG. 5, the base plate 11 and the rod 12 can be separate elements with the base plate being provided with a tubular section 25 for press-fitting therein a corresponding lower end section of the rod whereby welding of the rod to the base plate is eliminated. The base plate and the head member can be formed of lightweight metal such as aluminum and the nut and the rod can also be formed of aluminum or other metal capable of withstanding the weight imposed upon the flooring. Also the rod 12 can be tubular to further reduce its weight.

Referring now to FIGS. 6 to 10 of the drawings in detail, there is shown a pedestal which is similar to the pedestal already described except that the positions of the head and base are reversed to illustrate that the head and base can be in either of the positions, and except that this pedestal has additional advantageous feature which facilitate manufacture and assembly thereof. Corresponding parts have corresponding reference numerals applied thereto.

The pedestal shown in FIGS. 6 to 10 comprises base and head members 10 and 15 respectively having a base plate 11 and head portion 18 each formed with a tubular portion 25.

The lower end of the tube 19 is press fitted into the tubular portion 25 of the base member. The upper end of the tube 19 on the base member has press fitted thereon a collar 26 which is formed with the projections 24 and its upper end face 21. The lower end of the tube 19 on the head member has press fitted therein the threaded rod 12. The nut 14 is threaded on the rod and is provided with end faces 16 and 17 formed with the recesses 22 for reception of the projections 24. The collar 26 provides an annular end face of greater radial dimension whereby the projections 24 likewise are of greater radial dimension to provide a better interlock while using a tube 19 of minimum thickness.

The collar 26 has a radially inwardly extending key 27 at its upper end (FIG. 8) which slidably enters a longitudinally extending keyway 28 formed in the rod 12 (FIG. 6). This key and keyway arrangement prevents the head member 15 from being turned when the floor has been removed therefrom. Thus, the head members remain at their adjusted level, whereby the flooring can be replaced without leveling it again.

All the parts of the pedestal can be fabricated from aluminum. The base and head members can be die cast from the same mold. The tubes can be cut to any desired length, and the threaded rod, and the collar can be machined from suitable stock. The nut is die cast and then is threaded.

The pedestals can be made of one set of standardized stock parts, namely two identical parts providing the base and head members, one threaded rod and one nut. The height of the pedestals can be varied by using tubes of different lengths. These tubes need not be kept in stock but can be cut to their proper length from a long tube for each production run of pedestals, whereby warehousing and inventory problems are simplified.

A pedestal constructed in this manner and having a maximum height of about sixteen inches weighs only fifteen ounces.

In installing the elevated flooring, the pedestal is assembled as shown in FIG. 1 or 6, the nut 14 is positioned to provide the pedestal with its approximate height, the pedestal is placed between the true floor and one or more sections of elevation flooring in its proper position, the base member is secured to the floor, and head member is connected to the flooring.

The nut is then turned with a wrench so that the head member is positioned to level the flooring with the nut, when so adjusted, establishing registry of the recesses and projections. By reason of the eight recesses, a nut on a rod having ten threads per inch can adjust the height of the pedestal in increments of 0.0125 inch, whereby the out of true level of the flooring will never exceed plus or minus 0.00625 inch.

Furthermore, such installation and micrometric adjustment can be performed more rapidly with the pedestals disclosed herein than with the most sophisticated pedestals heretofore known. For example, a time study revealed that the pedestals in accordance with the present invention can be installed and adjusted in much less time than required. This represents a considerable saving in labor cost.

While the pedestals in accordance with the present invention have been described as supports for horizontal flooring, it will be understood that the pedestals can also be utilized for connecting and truly aligning vertical walls.

From the foregoing description, it will be seen that the present invention provides an improved pedestal which is simple and economical in construction, is rapidly installed and accurately adjusted, and is extremely light in weight but yet is sufficiently rugged to withstand such rough usage to which it may be normally subjected.

I claim:

1. An adjustable pedestal for elevated flooring locked in its adjusted position solely by a downward force imposed by the weight of the flooring, which pedestal comprises a base member to be placed on a sub-floor, a head member for supporting the flooring, one of said members having a threaded rod thereon and the other of said members having a tubular section for the reception of said rod, said rod having a longitudinally extending keyway on its outer surface and said tubular section having a fixed radially inwardly extending key at all times fitting and slidable in said keyway to allow slidable movement of said rod with respect to said tubular section but at all times preventing rotative movement between said rod and said tubular section, and a nut threated onto said rod and abutting the free end of said tubular section, the abutting surfaces of said nut and the free end of said tubular section having a plurality of circumferentially spaced cooperating recess and projection means adapted to mate and restrain turning movement of said nut with respect to said rod solely by the downward force imposed by the weight of the flooring on said nut.

2. A pedestal according to claim 1, wherein said key is on a collar secured to said tubular section to provide the free end thereof.

References Cited

UNITED STATES PATENTS

| 1,223,995 | 4/1917 | Marshall | 254—98 |
| 2,181,163 | 11/1939 | Akins | 254—101 |
| 3,084,911 | 4/1963 | Spiselman | 248—354 X |
| 3,279,134 | 10/1966 | Donovan | 52—126 |

FOREIGN PATENTS

| 56,439 | 4/1891 | Germany. | |

ROY D. FRAZIER, *Primary Examiner.*

FRANK DOMOTOR, *Assistant Examiner.*